United States Patent [19]

Fujitani et al.

[11] 4,087,259
[45] May 2, 1978

[54] PROCESS FOR PARTIALLY OXIDIZING HYDROCARBONS

[75] Inventors: Yoshiyasu Fujitani; Hideaki Muraki, both of Nagoya, Japan

[73] Assignee: Kabushiki Kaisha Toyota Chuo Kenkyusho, Japan

[21] Appl. No.: 689,907

[22] Filed: May 25, 1976

Related U.S. Application Data

[62] Division of Ser. No. 615,297, Sep. 22, 1975, abandoned.

[30] Foreign Application Priority Data

Sep. 20, 1974 Japan .................. 49-108974

[51] Int. Cl.² .................. C10G 11/28; C01B 2/16
[52] U.S. Cl. .................. 48/212; 48/215; 252/373
[58] Field of Search .................. 48/213, 215, 214 A, 48/212; 252/373, 466 PT, 472, 477 R

[56] References Cited

U.S. PATENT DOCUMENTS

| | | | |
|---|---|---|---|
| 2,267,753 | 12/1941 | Ruthardt | 252/472 |
| 2,866,692 | 12/1958 | Kautter et al. | 252/477 R |
| 3,271,325 | 9/1966 | Davies et al. | 48/214 A |
| 3,388,074 | 6/1968 | Reitmeier | 252/373 |
| 3,539,298 | 11/1970 | Fenton | 252/373 |
| 3,886,260 | 5/1975 | Unland | 423/213.5 |
| 3,951,860 | 4/1976 | Acres et al. | 252/466 PT |
| 3,956,190 | 5/1976 | Sinfelt | 252/472 |

Primary Examiner—Richard V. Fisher
Assistant Examiner—Peter F. Kratz
Attorney, Agent, or Firm—Oblin, Fisher, Spivak, McClelland & Maier

[57] ABSTRACT

A catalyst and a process for partially oxidizing hydrocarbons to hydrogen and carbon monoxide is provided. The catalyst consists essentially of rhodium, the rhodium being usually supported on a carrier. In the process, a mixture gas of a hydrocarbon such as naptha, gasoline and propane and an oxidizer such as air and/or oxygen is contacted with the rhodium catalyst at an elevated temperature.

3 Claims, 4 Drawing Figures

PROCESS FOR PARTIALLY OXIDIZING HYDROCARBONS

This is a division of application Ser. No. 615,297, filed Sept. 22, 1975 and now abandoned.

BACKGROUND OF THE INVENTION

1. Field of the Invention

This invention relates to a catalyst for use in partially oxidizing hydrocarbons to hydrogen and carbon monoxide.

2. Description of the Prior Art

Processes for partially oxidizing hydrocarbons such as naphtha, gasoline, heavy oil and the like are known as partial oxidation processes, i.e., partial combustion processes for hydrocarbons. Hydrogen and carbon monoxide produced in these processes are used as starting gases in ammonia synthesis, methanol synthesis, oxo synthesis and the like as town gas or as fuel for internal combustion engines such as those of motor vehicles.

In the past, partial oxidation of hydrocarbons has been carried out by bringing hydrocarbons into reaction with air or oxygen at a high temperature.

Conventionally, nickel and cobalt catalysts have been used for such partial oxidations. However, such catalysts have drawbacks in that their catalytic activities are impaired in quite a short period of time of service. This occurs because (1) carbon is deposited on the catalysts during the reaction and (2) spinels are produced due to the reaction of the catalytic element, such as nickel or cobalt, with a carrier such as alumina or the like supporting the catalytic element. Consequently, there is a need for a catalyst free from these disadvantages.

SUMMARY OF THE INVENTION

Accordingly, it is an object of the present invention to provide a catalyst and a process for partially oxidizing hydrocarbons to hydrogen and carbon monoxide which are highly efficient.

It is another object of this invention to provide a catalyst having high activity and high durability.

It is still another object of this invention to provide a catalyst which does not cause deposition of carbon during the reaction.

It is a further object of this invention to provide a process for achieving a high conversion rate for oxidation of hydrocarbons even at an extremely high space velocity.

It is a still further object of this invention to provide a process for achieving a high conversion rate for oxidation of hydrocarbons in a wide range of excess air ratios.

Briefly, these and other objects of this invention, as will hereinafter be made clear from the ensuing discussion, have been attained by providing a catalyst for partially oxidizing hydrocarbons to hydrogen and carbon monoxide which consists essentially of rhodium and a process for partially oxidizing a hydrocarbon to hydrogen and carbon monoxide, comprising forming a gas mixture of the hydrocarbons and an oxidizer, and contacting said gas mixture with a catalyst consisting essentially of rhodium at an elevated temperature.

BRIEF DESCRIPTION OF THE DRAWINGS

A more complete appreciation of the invention and many of the attendant advantages thereof will be readily attained as the same becomes better understood by reference to the following detailed description when considered in connection with the accompanying Drawings, wherein.

DESCRIPTION OF THE PREFERRED EMBODIMENTS

Figure 1:
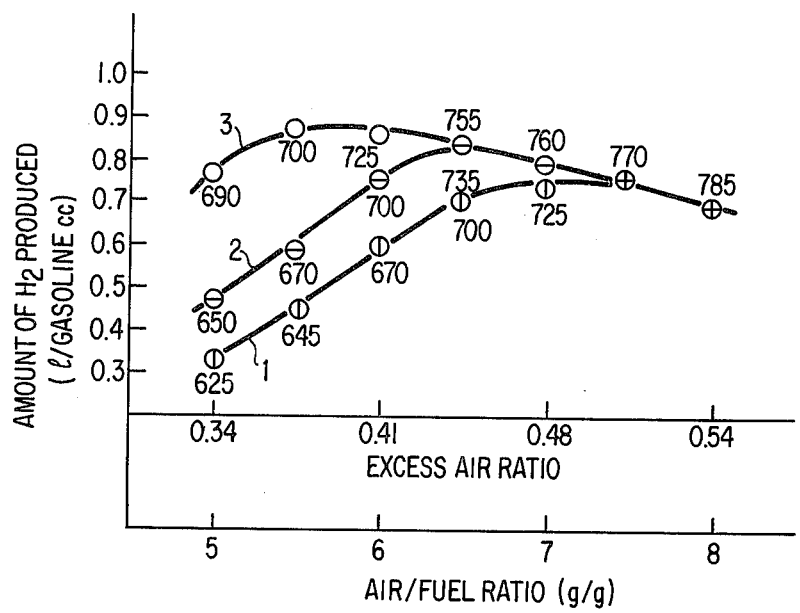
FIG. 1 and FIG. 2 are plots showing the relationship between amounts of hydrogen and carbon monoxide, respectively produced, and the excess air ratio in Example 2.

The present invention is directed to avoiding the aforesaid drawbacks of the prior art catalysts by providing catalysts which afford a high conversion rate. The superior features of the present invention reside in the use of rhodium as the catalytic element for partially oxidizing hydrocarbons.

The catalysts of the present invention enable the partial oxidation of hydrocarbons at a high conversion rate without causing deposition of carbon and without producing spinels due to the reaction of the catalytic elements with the carrier. In addition, the catalysts achieve a high conversion rate even at extremely high space velocities, thereby enabling a highly efficient partial oxidation.

The catalysts of the present invention include rhodium as the catalytic element. Rhodium exhibits consistent activity either in the form of a metal or in the form of an oxide. In this respect, rhodium may be used alone as the catalyst, for example, in the form of a screen of metallic rhodium. Since rhodium is expensive but has high activity, it is preferred, as is the case with general catalysts, that rhodium be supported on a carrier having, for example, a granular form or a honeycomb structure. Suitable such carriers are α-alumina, γ-alumina, α-alumina-magnesia, zirconia and the like. It is preferred that the amount of metallic rhodium to be supported on the carrier be in the range of 0.005% to 1.0% by weight. If the rhodium content is less than 0.005% by weight, a lowering in the catalytic activity results, thereby presenting the possibility of carbon depositing on the catalyst because of the attendant need to use a high temperature for the partial oxidation. On the other hand, when the rhodium content is greater than 1.0% by weight, there is no corresponding increase in the catalytic activity, even when the content is increased by a considerable degree.

Upon partial oxidation of hydrocarbons by using the catalyst of the present invention, the primary starting material hydrocarbon is first vaporized. Thereafter, air is added as an oxidizer, followed by mixing. The mixture obtained is then fed to a layer of catalyst maintained at a high temperature. As a result, the hydrocarbon is partially oxidized by the oxygen contained in the air, so that the hydrocarbon is primarily converted into hydrogen and carbon monoxide with a small amount of methane. Suitable hydrocarbons for use in this invention include heavy oil, fuel oil, naphtha, light oil, kerosene, gasoline, propane and the like. It is preferred that the reaction temperature at the catalyst bed at the time of the partial oxidation be in the range of 690° to 900° C. If the temperature is less than 690° C, there results insufficient conversion of the hydrocarbon into hydrogen and carbon monoxide, thereby failing to produce a yield of over 80%. On the other hand, if the temperature is greater than 900° C, thermal decomposition ensues producing ethylene or acetylene, thereby lowering the conversion efficiency of the hydrocarbon into hydrogen and carbon monoxide.

The amount of air used relative to the amount of hydrocarbon should provide an excess air ratio in the range of 0.34 to 0.51. The excess air ratio $A/A_o$ is the ratio of the amount of air (A) used in the reaction to the amount of air ($A_o$) which is required for the complete combustion of the hydrocarbon. If this ratio is less than 0.34, the desired partial oxidation will not be achieved. On the other hand, if the mixing ratio is greater than 0.51, there results a lowering in the yield of hydrogen and carbon monoxide.

The space velocity of the partial oxidation should preferably range from 0.5 to 25 l/hour in terms of "LHSV", the "Liquid Hourly Space Velocity", i.e., the liquid equivalent quantity (cc) of hydrocarbon passing through a catalyst bed of unit capacity (cc) in an hour. A space velocity of less than 0.5 l/hour yields an impractical conversion rate which is too small. On the other hand, a space velocity of greater than 25 results in incomplete partial oxidation, making possible a lower yield.

It is preferable to use air as the oxidizer from the viewpoint of economy. However, air may be substituted by an oxidizer which is abundant in oxygen such as oxygen or a mixture of oxygen and air. Air and/or oxygen mixed with steam may also be used as an oxidizer. In this case, the steam is decomposed by the catalyst so that the hydrogen of the water molecule is converted to hydrogen gas, while the oxygen serves as the oxidizer for the hydrocarbon. Furthermore, steam also serves the purpose of a coolant when the temperature of the catalyst bed reaches an abnormally high temperature. The quantity of steam to be added should preferably be not more than 0.5 by volume relative to the volume of the liquid hydrocarbon, in terms of the equivalent amount of water. In the case of steam addition, if the quantity of steam is increased, the quantity of hydrogen obtained due to the partial oxidation will also be increased accordingly. On the other hand, the yield of carbon monoxide will remain substantially constant in spite of the additional steam. When steam is added coupled with air for the partial oxidation, the catalyst temperature, excess air ratio, and LHSV should preferably have values which are the same as those for the case when air is used alone.

Having generally described the invention, a more complete understanding can be obtained by reference to certain specific Examples, which are provided for purposes of illustration only and are not intended to be limiting unless otherwise specified.

EXAMPLE 1

The hydrocarbon, gasoline was subjected to partial oxidation by using air with the aid of a rhodium catalyst according to the present invention. In addition, a prior art nickel catalyst and cobalt catalyst were used in the partial oxidation for comparison purposes.

More particularly, 100 cc samples of spherical γ-alumina catalyst carriers (diameter about 3 mm, surface area 140 m²/g, packing density 0.72 g/cc), were immersed for one hour at room temperature in 100 cc of rhodium chloride solutions each having three different concentrations. The alumina was then removed from the solutions and baked at 800° C for three hours after drying for 20 hours at 110° C. Thereby, three different rhodium catalysts were prepared.

The rhodium catalysts thus obtained were filled into a tubular quartz converter having an inner diameter of about 30 mm. The catalyst bed was heated to 600° C. A mixed gas of commercially available gasoline (of average composition $C_7H_{10.8}$) and air was fed to the catalyst bed for partial oxidation. The compositions of the converted gases were measured. Gasoline was gasified at about 250° C beforehand, and the gas was mixed with air. An excess air ratio of 0.41 (air fuel ratio of 6.0) and an LHSV of 2 l/hour were used. The catalyst bed at the time of the partial oxidation was maintained at about 700° C reaction temperature. The term "air fuel ratio" as used herein is the ratio of the amount (by weight) of air to the amount of gasoline (by weight). The excess air ratio is obtained by dividing the air fuel ratio by the theoretical air fuel ratio (14.7 in the case of gasoline in this Example).

The amounts of rhodium supported on the carrier and the results of the partial oxidation are given in Table 1. In addition, the results of the partial oxidation by using a prior art nickel catalyst and a cobalt catalyst are also given in Table 1. The latter two catalysts were prepared under the same conditions as for the rhodium catalyst, by subjecting the same to immersion, drying and baking and by using aqueous solutions in which 25% by weight of nickel nitrate or cobalt nitrate was dissolved.

TABLE 1

| Catalyst No. | Catalytic element | Amount of element loaded (wt.%) | Composition of gas converted (%) | | | | | Change rate (%) | |
|---|---|---|---|---|---|---|---|---|---|
| | | | $H_2$ | CO | $CH_4$ | $N_2$ | Others | | |
| 1 | Rh | 0.05 | 16.5 | 18.3 | 1.5 | 54 | 9.7 | 100 | Present invention |
| 2 | " | 0.12 | 19.0 | 21.0 | 1.4 | 51 | 7.6 | 100 | |
| 3 | " | 0.2 | 19.5 | 22.0 | 1.0 | 50 | 7.5 | 100 | |
| $C_1$ | Ni | 7 | 10.0 | 12.2 | 1.8 | 63 | 13.0 | 90 | Comparative examples |
| $C_2$ | Co | 7 | 7.0 | 8.3 | 1.2 | 67 | 16.5 | 80 | |

In Table 1, "others" denotes gases of $C_2$ compounds such as ethylene, ethane and the like, plus carbon dioxide and steam. The term "change rate" denotes the percentage of gasoline changed to materials other than gasoline. The term "Amount of element loaded" is defined as the ratio of the amount of rhodium to the amount of carrier by weight.

Table 2 shows the amount (l) of gas produced per unit amount (cc) of starting liquid gasoline for hydrogen, carbon monoxide and methane as given in Table 1. The values of those amounts refer to the volumes at 20° C.

Table 2 also indicates the yields of hydrogen and carbon monoxide. The term "yield" as used herein is the amount actually obtained relative to the theoretical amount which would be obtained if the gasoline were completely converted into hydrogen and carbon monoxide. The theoretical amount of hydrogen is 0.93 (l/gasoline cc), while that of carbon monoxide is 1.2 (l/gasoline cc).

TABLE 2

| Catalyst No. | Amount of gas produced (l/gasoline cc) | | | Yield (%) | |
| --- | --- | --- | --- | --- | --- |
| | $H_2$ | CO | $CH_4$ | $H_2$ | CO |
| 1 | 0.77 | 0.97 | 0.10 | 83 | 81 |
| 2 | 0.88 | 1.12 | 0.10 | 95 | 94 |
| 3 | 0.89 | 1.15 | 0.10 | 96 | 96 |
| $C_1$ | 0.33 | 0.43 | 0.07 | 36 | 36 |
| $C_2$ | 0.28 | 0.35 | 0.06 | 30 | 29 |

As can be seen from Tables 1 and 2, the catalysts of the present invention exhibit high conversion rates and extremely high yields of hydrogen and carbon monoxide even when only a small amount of catalytic element is supported as compared to the prior art catalysts. Furthermore, no deposition of carbon was observed during the use of the catalysts of the present invention.

EXAMPLE 2

Gasoline was subjected to partial oxidation at varying excess air ratios (or air fuel ratios) and at varying catalyst temperatures, using a rhodium catalyst containing 0.12% by weight of rhodium. The amounts of hydrogen and carbon monoxide were measured.

The LHSV was 2 l/hour and the starting gasoline was of the same composition as used in Example 1. The partial oxidation was carried out in such a manner that the catalyst layer was heated to 400°, 500° or 600° C beforehand, and then a mixture gas of gasoline and air was fed to each catalyst bed.

Figure 2:
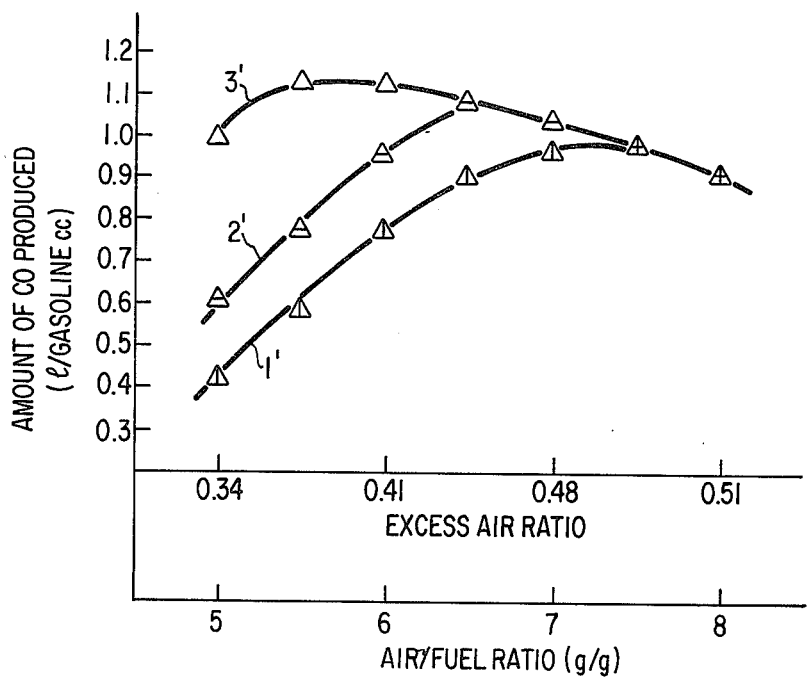

FIG. 1 indicates the results of the measurements of hydrogen, while FIG. 2 indicates those of the measurements of carbon monoxide. In FIGS. 1 and 2, the excess air ratio (or air fuel ratio) is represented by the abscissa, while the amount of hydrogen or carbon monoxide produced (l/gasoline cc) is represented by the ordinate. The curves 1 and 1', 2 and 2', and 3 and 3' indicate the amounts of the gases produced at preheating temperatures of 400° C, at 500° C, and 600° C, respectively. The reference numerals such as 690, 700 and the like denoted on the curves of FIG. 1 represent the catalyst temperatures at the time of the partial oxidations under the aforesaid conditions. The catalyst temperatures are omitted from FIG. 2, since these temperatures correspond to those of FIG. 1. For instance, for an excess air ratio of 0.41 and a catalyst preheating temperature of 500° C (curve 2' in FIG. 2), the catalyst temperature is 700° C. FIG. 1 illustrates that, for example, with an excess air ratio of 0.41 (air fuel ratio of 6.0) and a catalyst preheating temperature of 500° C (curve 2), the catalyst temperature is 700° C and the amount of hydrogen produced is 0.76 l/gasoline cc. In this case, the yield of hydrogen is 0.76 × 100/0.93 = 82%.

As is clear from FIGS. 1 and 2, large amounts of gases are produced showing that high yields can be obtained throughout a wide range of excess air ratios. On the other hand, in order to obtain a yield of over 80% for hydrogen (0.93 × 0.8 = 0.744 l/gasoline cc and above), it is necessary that the catalyst temperature be above 690° C and the excess air ratio be in the range of about 0.34 to 0.51. Similarly, for obtaining a yield of over 80% for carbon monoxide (1.2 × 0.8 = 0.96 l/gasoline cc and above), the same conditions as above are required.

EXAMPLE 3

The partial oxidation was carried out using an excess air ratio of 0.41 (air fuel ratio of 6.0) and a catalyst temperature of 725° C while varying the LHSV and using the catalysts and gasoline of Example 2. The amounts of hydrogen, carbon monoxide and methane produced were measured.

Figure 3:
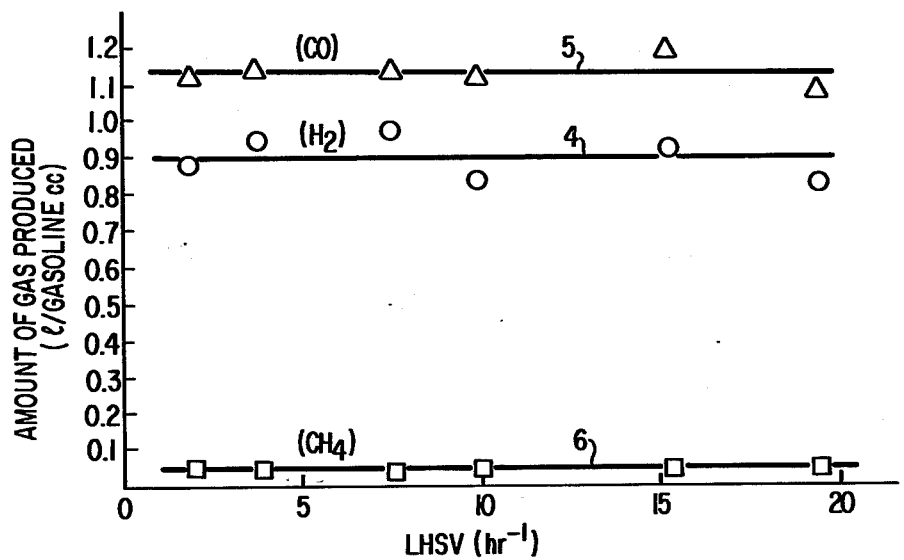
FIG. 3 is a plot depicting the relationship between the amount of gas produced, and the LHSV (liquid hourly space velocity)

In FIG. 3, LHSV (l/hour) is represented on the abscissa, while the amounts of gases measured (l/gasoline cc) are represented by the ordinate. In FIG. 3, curves 4, 5, and 6 represent the respective amounts of hydrogen, carbon monoxide and methane.

As can be seen from FIG. 3, substantially consistent high yields, such as 97% for hydrogen and 95% for carbon monoxide, are obtained throughout a wide range of LHSV. Such high yields are possible even at LHSV as high as 20. The fact that such a high yield can be achieved at such a high LHSV suggests an extremely high production rate, demonstrating the excellence of the catalysts of the present invention. If LHSV 20 is represented in terms of a space velocity of a mixture gas of air and gasoline, there results a value as high as 75,000 l/hour.

In addition, it can be seen that there is produced only a small amount of methane as a byproduct, even over a wide range of variation in LHSV.

EXAMPLE 4

The partial oxidation was carried out by adding steam to a mixture of air and gasoline using the catalysts and gasoline of Example 2. Catalyst temperatures of 700° or 800° C and an LHSV of 2 l/hour were used. The addition of steam was such that the excess air ratio was first set at 0.41 (air fuel ratio 6.0); the amount of air was gradually reduced; and the amount of oxygen contained in the mixture gas, which had been reduced due to the decrease in the amount of air, was compensated for by the oxygen contained in steam. For instance, when the excess air ratio was reduced by 0.1, i.e., the air fuel ratio was reduced by 1.4, the amount of steam to be fed was 0.22 cc/gasoline cc. in terms of the water equivalent amount.

Figure 4:
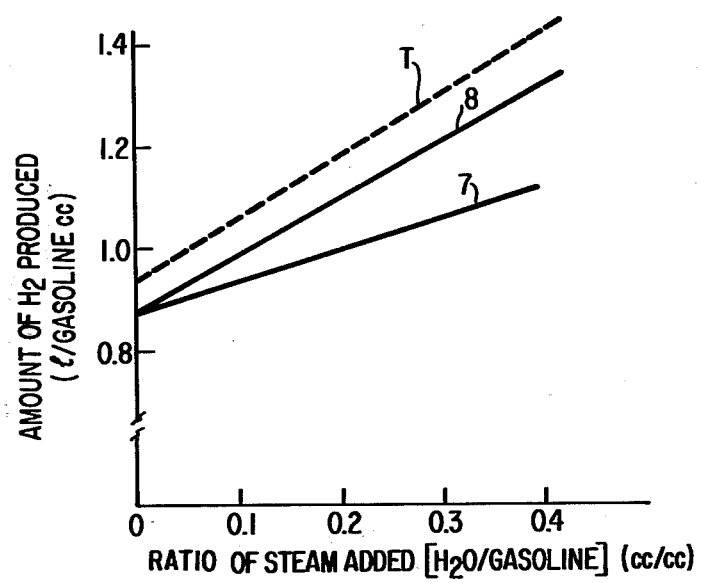
FIG. 4 is a plot showing the relationship between the amount of hydrogen produced and the ratio of steam added.

FIG. 4 shows the results of the partial oxidation in which the ratio of steam added (i.e., the amount of water (cc) added relative to 1 cc of liquid gasoline) is represented by the abscissa, while the amount of hydrogen produced (l/gasoline cc) is represented by the ordinate. Lines 7 and 8 show the results for catalyst temperatures of 700° and 800° C, respectively. The line T represents the theoretical amount of hydrogen, assuming that the hydrogen contained in the hydrocarbon and steam molecules was all converted to hydrogen gas. The amounts of the water and gasoline are values calculated at 20° C.

The amount of carbon monoxide produced in the aforesaid partial oxidation falls in the range of 1.00 to 1.05 l/gasoline cc, irrespective of the ratio of steam added and the catalyst temperature. The yield thereof ranges from 83 to 87%.

As can be seen from FIG. 4, the yield of hydrogen can be increased by the addition of steam. (This is based on a comparison of the case wherein steam is added, with the case wherein steam is absent, as shown by point 0 in FIG. 4.) The catalyst temperature of 800° C results in a yield of hydrogen as high as about 93%. Although the catalyst temperature of 700° C results in a decrease in the yield of hydrogen with an increase in the ratio of steam added, a yield of about 80% for hydrogen is still achieved even when the ratio of steam added is 0.4. Furthermore, if the ratio of steam added is 0.35, there can be achieved an increase in hydrogen yield, such as of about 45% at 800° C and about 25% at 700° C, in contrast to the case where steam is absent.

On the other hand, a yield of carbon monoxide as high as about 85% can be achieved, irrespective of the ratios of steam added.

EXAMPLE 5

The partial oxidation was carried out by using a rhodium catalyst (amount of rhodium loaded, 0.12%) of the present invention under the same conditions as in Example 1, with naphtha used as the hydrocarbon.

The naphtha used had an average composition of $C_7H_{14.4}$, a density of 0.68 g/cm$^3$, an octane number of 60.0, and a vapor pressure of 0.69 kg/cm$^2$ (at 20° C).

As a result, there were obtained a yield of 96% for hydrogen and a yield of 95% for carbon monoxide, the change rate of naphtha being 100%.

EXAMPLE 6

Columnar granules of zirconia (diameter about 3 mm, length 3 mm, surface area 50 m$^2$/g, packing density 1.9 g/cc) were used as a carrier. The catalysts of the present invention were prepared as in Example 1, in which the amount of rhodium loaded was 0.05%.

Subsequently, the partial oxidation was carried out for gasoline of the same composition as used in Example 1, using an excess air ratio of 0.41 (air fuel ratio 6.0), an LHSV 2, and a catalyst temperature of 725° C.

As a result, a yield of 98% was obtained for hydrogen, and a yield of 85% was achieved for carbon monoxide.

EXAMPLE 7

Catalysts of the present invention, in which the amount of rhodium loaded is 0.1%, were prepared in the same manner as in Example 1, by using a honeycomb carrier of α-alumina-magnesia. The carrier used had a water absorbing rate of 40%, while the honeycomb structure had square holes (1.5 × 1.5 mm) and a wall thickness of about 0.4 mm. Meanwhile, when rhodium was supported on the carrier, an alcohol solution of rhodium chloride was used to uniformly support rhodium on the honeycomb structure.

Subsequently, the partial oxidation was carried out under the same conditions as in Example 6, except for using a catalyst temperature of 820° C.

As a result, a yield of 98% was achieved for hydrogen, and a yield of 98% was achieved for carbon monoxide.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for partially oxidizing a hydrocarbon to hydrogen and carbon monoxide comprising: mixing a gas mixture of a hydrocarbon selected from the group consisting of naphtha, heavy oil, fuel oil, light oil, kerosene, gasoline and propane and an oxidizer selected from the group consisting of air, oxygen, a mixture of air and oxygen, a mixture of air and steam and a mixture of oxygen and steam, wherein the amount of said oxidizer employed based upon free oxygen as the oxidizing agent relative to said hydrocarbon is equivalent to the amount of air used in an excess air ratio ranging from 0.34 to 0.51 when air is used as said oxidizer; and reacting said gas mixture in the presence of a catalyst consisting essentially of from 0.005 wt.% to 1.0 wt.% rhodium supported on a carrier at 690° C to 900° C at a liquid hourly space velocity ranging from 0.5 to 25 liters per hour.

2. The process of claim 1, wherein said oxidizer is air and the mixing ratio of air to the hydrocarbon is such that the ratio of the amount of air employed to the equivalent amount required for complete combustion of the hydrocarbon is in the range of 0.34 to 0.51.

3. The process of claim 1, wherein said oxidizer is a mixture of air and steam or a mixture of oxygen and steam and the mixing ratio of steam to the liquid hydrocarbon is not more than 0.5 by volume in terms of the equivalent amount of water.

* * * * *